US007140178B2

(12) United States Patent
Bitter

(10) Patent No.: US 7,140,178 B2
(45) Date of Patent: Nov. 28, 2006

(54) HYDRAULIC ARRANGEMENT

(75) Inventor: Marcus Bitter, Contwig (DE)

(73) Assignee: Deere & Company, Moline, IL (US)

(*) Notice: Subject to any disclaimer, the term of this patent is extended or adjusted under 35 U.S.C. 154(b) by 27 days.

(21) Appl. No.: 11/077,645

(22) Filed: Mar. 11, 2005

(65) Prior Publication Data

US 2005/0198949 A1 Sep. 15, 2005

(30) Foreign Application Priority Data

Mar. 13, 2004 (DE) ...................... 10 2004 012 362

(51) Int. Cl.
*F15B 1/00* (2006.01)
*B66F 9/00* (2006.01)
*B62D 37/00* (2006.01)

(52) U.S. Cl. .......................................... 60/413; 60/469

(58) Field of Classification Search .................. 60/413, 60/469

See application file for complete search history.

(56) References Cited

U.S. PATENT DOCUMENTS 5,116,188 A * 5/1992 Kurohashi et al. ............ 60/413
5,513,491 A * 5/1996 Broenner et al. ............. 60/413
5,992,146 A * 11/1999 Hausman ..................... 60/413
6,382,326 B1 * 5/2002 Goins et al. ................ 172/239

FOREIGN PATENT DOCUMENTS

DE 41 29 509 9/1991
DE 42 21 943 7/1992
DE 196 08 758 3/1996
DE 197 54 828 12/1997
DE 101 33 616 7/2001
DE 102 27 966 6/2002
EP 03 81 788 10/1994
EP 1 157 963 5/2001
EP 11 97 963 4/2002
GB 2 090 811 1/1982
WO WO 90/05814 11/1988

OTHER PUBLICATIONS

Patent Abstracts of Japan, Bd. 013, Nr. 060 (M-796), Feb. 10, 1989 & JP 63 265023 A, Nov. 1, 1988.

* cited by examiner

*Primary Examiner*—Thomas E. Lazo

(57) ABSTRACT

A hydraulic arrangement is provided, including: a hydraulic cylinder that is provided with a first and a second chamber, a hydraulic reservoir, a hydraulic fluid feeder conveying hydraulic fluid, a hydraulic accumulator, a hydraulic line arranged between the hydraulic accumulator and the first chamber, a control valve arranged in the hydraulic line, a first supply line for the first chamber, a second supply line for the second chamber, and a controller with a lifting position, a lowering position, a neutral position, and a spring support position for controlling the hydraulic cylinder. The second supply line is fluidly connected to the hydraulic reservoir and the first and second supply lines are substantially prevented from being fluidly connected to the hydraulic fluid feeder when the controller is in the spring support position.

9 Claims, 2 Drawing Sheets

HYDRAULIC ARRANGEMENT

FIELD OF INVENTION

The invention relates generally to a hydraulic arrangement for controlling a boom or a linkage of an agricultural machine. More specifically, the invention relates to a hydraulic arrangement having a spring support mode.

BACKGROUND

In agricultural machines, such as, for example, telescopic loaders, wheel loaders, or front loaders on tractors, it is known practice to apply a hydraulic spring support system that provides spring support for the boom or the linkage in order to attain an improved spring suspension comfort, particularly during the operation. Here the lifting side of the hydraulic cylinder is connected to a hydraulic accumulator by means of an appropriate hydraulic arrangement of valves, in order to provide spring support by the hydraulic accumulator. Furthermore the lowering side of the hydraulic cylinder is connected to a hydraulic reservoir, in order, on the one hand, to avoid cavitation during the lowering and, on the other hand, to permit free movement of the piston rod during the spring support process. To improve safety against a sudden sinking of the boom or the linkage, these spring support systems can be equipped with load holding valves to secure these systems against hose breakage. However it is then necessary, in order to permit a lowering of the hydraulic cylinder, to close the reservoir connection on the lowering side of the cylinder, so that a sufficient pressure is built up in order to open the load holding valve. Only after opening the load holding valve can hydraulic fluid drain off from the lifting side of the hydraulic cylinder.

A hydraulic arrangement for such a spring support system is disclosed in EP 1 157 963 A2. A spring support system is proposed for the boom of a telescopic loader that is provided with a load holding valve or an automatic shut-off valve in order to secure the boom against falling off. A separate selector valve is arranged in order to be able to open the load holding valve on the one hand, and on the other hand, to make available a spring support function even in the neutral position of the hydraulic cylinder. The valve must be closed so as to close a connection to the reservoir established for the spring support in order to be able to build up the pressure in the supply line needed to open the load holding valve. This condition makes it necessary for the "lowering" function of the hydraulic cylinder to be detected or monitored at an appropriate location and must be considered in the switching logic of the spring support arrangement for the closing of the control valve, which has been found to be particularly costly and problematical in the case of purely mechanically actuated controllers. In this connection EP 1 157 963 A2 points to a monitoring arrangement in the form of a sensor on the controller that is to determine whether or not the boom is to be lowered. Without a fixed monitoring arrangement or with a defective monitoring arrangement for the controller or for the "lowering function" switching errors could occur in the hydraulic arrangement.

SUMMARY

The task underlying the invention is seen in the need to create a hydraulic arrangement of the aforementioned type with which the cost of the attainment of the "lowering function" can be reduced. In particular a switching error in the hydraulic arrangement for the "lowering function" is to be prevented in the case of a defective or non-existing monitoring arrangement.

The task is solved, according to the invention, by a hydraulic arrangement having a hydraulic cylinder with first and second chambers, a hydraulic reservoir, a hydraulic fluid feeder conveying hydraulic fluid, a hydraulic accumulator, a hydraulic line arranged between the hydraulic accumulator and the first chamber, a selector valve arranged in the hydraulic line, a first supply line for the first chamber, a second supply line for the second chamber, and a controller with at a lifting position, a lowering position, a neutral position, and a spring support position for controlling the hydraulic cylinder.

When the controller is in the spring support position, the second supply line is connected with the reservoir, the hydraulic accumulator is configured to selectively urge the hydraulic fluid towards the first chamber, and the first and second supply lines are substantially prevented from being connected to the fluid feeder. Since the controller is provided with a fourth switch position, a second selector valve can be omitted that would connect the second chamber of the hydraulic cylinder with a reservoir, as is provided in conventional solutions. Thereby, the technical cost is considerably reduced, particularly since a monitoring arrangement of the "lowering function" of the hydraulic cylinder can be omitted. Thereby, only a single control valve is used, preferably with which only the lifting side of the hydraulic cylinder is connected to the hydraulic accumulator.

A fourth switch position, according to the invention, offers the advantage that in addition to a lifting position and a lowering position, a further neutral position can be provided for the hydraulic cylinder in which both supply lines are closed. In the neutral position the connection between the lowering side of the hydraulic cylinder and the reservoir should preferably be closed, since there are applications with wheel loaders, telescopic loaders as well as front loaders in which a certain contact pressure is to be generated for a tool fastened to the boom, which would not be possible with a constant connection to the reservoir and would thereby lead to a disadvantage in comparison to competitive products. Therefore it is advantageous to add a fourth switch position, according to the invention, so as to provide the lifting and lowering position as well as the neutral position.

The controller can be configured in such a way that a fourth switch position switches to a so-called floating position. In the floating position the first supply line is switched together with the second supply line and both supply lines are connected to the reservoir, where the second inlet to the controller is closed so that there is no supply on the part of the hydraulic fluid feeder. A floating position as a fourth switch position is not absolutely required, it is sufficient if the fourth switch position connects only the second chamber of the hydraulic cylinder with the reservoir.

In the spring support position the controller connects the second supply line directly with the reservoir, that is, no further valves or other devices are required (except for a connecting line from the controller to the reservoir). The controller can be configured so that it can be operated manually or even electrically, where obviously other methods are also conceivable, for example, pneumatic or hydraulic methods that shall, however, not be explained in any further detail.

The control valve is preferably provided with a closing position and an opening position, where in the opening position the control valve closes in one or both closing directions, but in the opening direction it opens in both directions, so that a spring support function occurs in connection with the hydraulic accumulator. The control valve can be configured in such a way that in the closing position hydraulic fluid from the hydraulic cylinder can flow through the hydraulic accumulator, so that the hydraulic accumulator is always preloaded with the highest load pressure that occurs during an operating cycle. Moreover the control valve can also be configured in such a way that in the closing position it seals in the opposite direction or even in both directions. Furthermore, by-pass arrangements around the control valve by means of check valves and orifices are conceivable in order to load the hydraulic accumulator. The control valve is preferably actuated electrically. It is obviously also conceivable that other actuation methods are applied to the control valve, for example, a manual, hydraulic or pneumatic actuation.

If the spring support is now to be activated, which can be performed by means of a switch actuated by the operator in the operator's cab of the vehicle, or, for example, also by a speed signal, then the control valve is switched to its open position and the controller is switched into its fourth switch position in order to connect the first chamber of the hydraulic cylinder with the reservoir. During an excitation by the running gear of the operating machine, jerk-like accelerations caused by the free swinging of the boom or the linkage can be damped, so that an increase in the operating comfort can be attained.

If the boom or the linkage is lowered when the spring support is activated, repositioning of the controller into the lowering position results in an automatic closing of the connection of the second chamber of the hydraulic cylinder with the reservoir and hydraulic fluid flows into the second chamber of the hydraulic cylinder, where a sufficiently high pressure can be built up in order to open the load holding valve that is absolutely necessary for the lowering of the boom or the linkage. In the commercially available spring support systems with load holding valve or a automatic shut-off valve a second control valve is required which establishes the connection to the reservoir required for a spring support function and that must be closed in order to assure the necessary pressure build up.

If the boom or the linkage is raised with the lifting position of the controller when the spring support is activated, the second chamber of the hydraulic cylinder is automatically connected to the reservoir in order for the hydraulic fluid displaced by the lifting process to flow from the hydraulic cylinder to the reservoir. If during the lifting process an impact is transmitted to the boom or the linkage, this or these can deflect the springs without any danger of cavitation, since the second chamber is drained so as to relieve pressure to the reservoir.

Only in the neutral position of the controller must the control valve be closed, it connects the first chamber with the hydraulic accumulator, since here there is the danger during the spring deflection of the boom or the linkage that a negative pressure exists in the second chamber of the hydraulic cylinder (cavitation), that can damage the seals of the hydraulic cylinder. In order to operate the boom or the linkage without any problem, the control valve is preferably always closed automatically, that is, it is brought into its closing position, when the controller is in its neutral position, as long as the spring action is active. For this purpose means are preferably provided that determine whether or not the control valve is in its closed neutral position. This can be accomplished, for example, in the form of a switch that is switched in connection with or as a function of the neutral position at the controller. With electro-hydraulically controlled controllers such a switch is usually not required, since this task can be taken over by the software of an electronic control unit. Beyond that it is insignificant where and how the switch position of the controller is detected, since merely the result is of interest. An aforementioned switch can be attached to a joystick, an actuating mechanism including a rope pull, or directly to the controller. A sensor is also conceivable here that receives a proportional signal which is converted into an electrical signal in an appropriate software electronic, that switches the control valve into the closing position. It would also be conceivable to use a pressure switch or a pressure sensor that determines the pilot control pressure that is sent to the controller by the joystick as control signal. Thereby the result is a multitude of possibilities of determining the switch position of the controller.

In order to permit the neutral position to be passed when the spring support is active, without immediately switching the control valve into the closing position, a preferred embodiment of the invention provides a time delay element. A passing of the neutral position may be necessary, for example, if the neutral position on the controller is located directly between the lifting and the lowering positions and the control is to be switched directly from a lifting position to a lowering position. The switch delay element provides that the switching of the control valve is not performed in the case of a simple passing of the neutral position. Only after a predetermined delay time in the neutral position has been reached, then the control valve is brought into the closing position.

In an electrically or electro-hydraulically controlled controller the control software may also consider, for example, that when the joystick is not actuated the controller is fundamentally not brought into its neutral position when the spring support is activated, but is switched again into the fourth switch position. It would equally be conceivable, as is common on some wheel loaders, that the spring support is fundamentally deactivated during the lifting and lowering of the boom or the linkage. As a very simplified version of the system it would also be conceivable that the spring support is active exclusively when the controller is in its fourth switch position. In this way the cost of the electronics can be reduced considerably, since merely one switch is required that opens or closes the control valve.

The controller is preferably configured as a slide valve that is provided with four switch positions, each of which has two inlets and two outlets. In the individual positions the supply lines of the controller are connected to the hydraulic fluid feeder or to the reservoir in various ways or closed, corresponding to the positioning function (lifting, lowering, neutral position (holding) and spring support).

The automatic shut-off valve preferably includes a check valve that closes in the direction of the controller and a pressure limiting valve or relief valve, where the relief valve can be controlled by the pressures existing in the connecting lines. This control is performed by pilot pressure lines that extend from the relief valve to the first and the second supply line. The check valve is arranged in a by-pass line that bypasses the relief valve, where the check valve opens in the direction of the first chamber. Other possibilities for the automatic shut-off valve are also conceivable. In this way, for example, pressure switches can also be used that actuate a control valve upon a pressure drop.

In comparison to conventional spring support systems, the result here is a more cost effective hydraulic arrangement, since the necessary second control valve is omitted along with its hose connection on the side of the second chamber of the hydraulic cylinder and instead a commercially available slide valve with a floating position function can be used. Due to the omission of the second control valve the number of possible sources of failure is also reduced, since one less component is applied. Furthermore, favorable configuration possibilities are offered since less space is required for this configuration.

Particularly in the case of tractors with front loaders the usual practice is to secure the hydraulic and electric connection between the front loader and the tractor by means of so-called multi-couplers, which permit a rapid and simple connection and separation. Due to the use of a hydraulic arrangement, according to the invention, these multi-couplers can be retained since no additional hose is required for the connection of the lowering side of the hydraulic cylinder with the reservoir. On the basis of the internal connection of the controller in its fourth switch position with the reservoir, the second chamber of the hydraulic cylinder can be supplied by means of the second supply hose that is already available.

BRIEF DESCRIPTION OF THE DRAWINGS

The drawing shows an embodiment of the invention on the basis of which the invention as well as further advantages and advantageous further developments and embodiments of the invention shall be explained and described in greater detail in the following.

DETAILED DESCRIPTION

Figure 1:
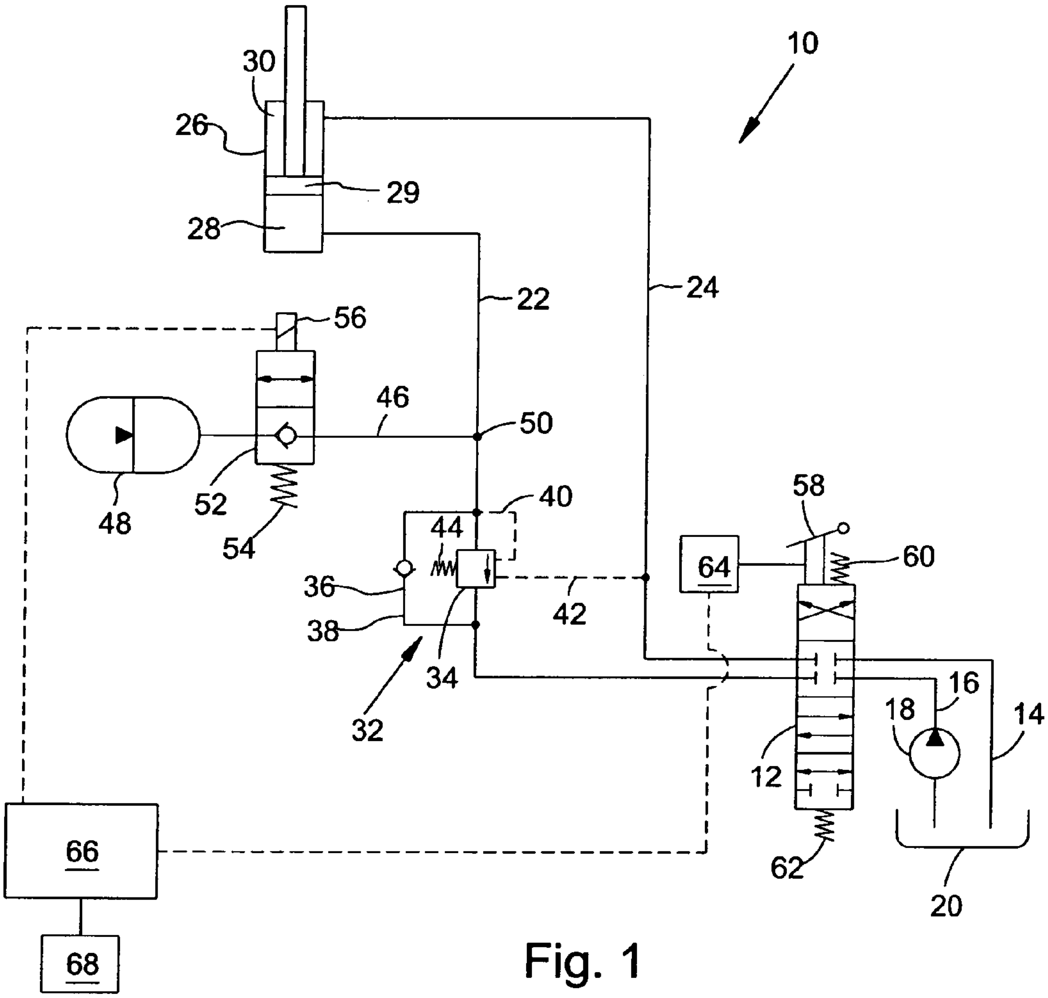
FIG. 1 shows a hydraulic arrangement for a spring support system of a hydraulic cylinder.

A hydraulic arrangement 10 shown in FIG. 1 shows an embodiment according to the invention for the attainment of a spring support. The hydraulic arrangement 10 includes a controller 12 that can be switched, for example, a slide valve that is connected by hydraulic lines 14, 16 with a pump 18 and a hydraulic reservoir 20, where the controller 12 can be switched in four operating positions, lifting, neutral, lowering, and spring support positions. The controller 12 is preferably controlled manually, but can also be controlled electrically, hydraulically or pneumatically.

The controller 12 is connected to a hydraulic cylinder 26 over a first and a second supply line 22, 24, where the first supply line 22 leads to a first chamber 28 of the hydraulic cylinder 26 and the second supply line 24 leads to the second chamber 30 of the hydraulic cylinder 26. A piston 29 separates the two chambers 26, 28 from each other. The first chamber 28 of the hydraulic cylinder 26 represents the piston end chamber or the lifting chamber, whereas the second chamber 30 represent the rod end chamber or the lowering side chamber of the hydraulic cylinder.

A load holding valve arrangement or automatic shut-off valve 32 is provided in the first supply line 22. The automatic shut-off valve 32 contains a pressure and spring controlled relief valve 34 as well as a check valve 36 that opens to the hydraulic cylinder side that is arranged over a bypass line 38 parallel to the relief valve 34. A pressure connection from the relief valve 34 to the section of the first supply line 22 on the side of the hydraulic cylinder is established over a first pressure line 40. A further pressure connection is established from the relief valve 34 to the second supply line 24 over a second pressure line 42. Moreover an adjusting spring 44 holds the relief valve 34 in its closing position.

A hydraulic line 46 connects the first chamber 28 or the first supply line 22 with a hydraulic accumulator 48, where the end 50 of the hydraulic line 46 that is not connected to the hydraulic accumulator 48 is arranged between the first chamber 28 and the automatic shut-off valve 32.

A control valve 52 is arranged in the hydraulic line 46. The control valve 52 represents an electrically controlled seat valve, which is held in its closed position over an adjusting spring 54 and that can be brought into its open position by means of a magnetic coil 56. Here the control valve 52 seals in closing position in the direction of the hydraulic accumulator 48. Here the control valve may also be configured in such a way that it seals in both directions without any leakage. When the control valve 52 is in the open position, the hydraulic fluid is permitted to flow between the hydraulic accumulator 48 and the hydraulic line 46.

The individual operating conditions can now be controlled by the controller 12 as well as by the control valve 52 as follows. As shown in FIG. 1 the controller 12 is retained in neutral position by a pair of springs 60, 62. The control valve 52 is in a closed position. Upon a control signal or, as shown in FIG. 1, by manual actuation the controller 12 is brought out of the neutral position into the lifting, lowering or spring support position by means of an actuating arrangement 58. This may also be a manual, electric, hydraulic or pneumatic actuating arrangement 58.

The neutral position of the controller 12, shown as the second position from the top of the controller 12 in FIG. 1, is detected on the basis of a switch or a sensor connected with the actuating arrangement 58 and a signal is transmitted to a control unit 66. The control unit 66 is connected with the control valve 52 and retains or forces the control valve 52 into the closing position when the controller 12 is in its neutral position. Preferably the control unit 66 is provided with a time delay device, which has the effect that the control unit 66 brings the control valve 52 into the closing position only after a predetermined time delay of the controller in the neutral position. This provides the assurance that the control unit 66 closes the control valve 52 when the switch is performed over the neutral position, but not in every switch process of the controller 12. The control valve 52 is brought into the closing position only at a time that the controller 12 is actually switched into the neutral position.

In the lifting position, shown as the third position from the top of the controller 12 in FIG. 1, the connection of the first supply line 22 with the pump 18 and the connection of the second supply line 24 with the hydraulic reservoir 20 is established. The pump 18 that is connected with the hydraulic reservoir 20 fills the first chamber 28 of the hydraulic cylinder 26 over the first supply line 22 and over the check valve 36 of the automatic shut-off valve 32 (the relief valve 34 of the load holding valve 32 is in its closing position). As a result the piston 29 moves in the direction of the second chamber 30 and forces the hydraulic fluid located there through the second supply line 24 into the hydraulic reservoir 20. If then the system is again shifted into the neutral position then the controller 12 suppresses the connections to the pump 18 and to the hydraulic reservoir 20 so that the pressure in the two chambers 28, 30 of the hydraulic cylinder 26 is maintained and the movement of the piston 29 is stopped. The piston 29 remains stationary.

In the lowering position, shown as the top position of the controller 12 in FIG. 1, the connection of the first supply line 22 with the hydraulic reservoir 20 and the connection of the second supply line 24 with the pump 18 is established. The pump conveys hydraulic fluid into the second chamber 30 of the hydraulic cylinder 26 where the pressure building up in the supply line 24 opens the relief valve 34 of the automatic shut-off valve 32 over the second pressure line 42. Simultaneously the piston 29 is moved in the direction of the first chamber 28, so that the hydraulic fluid flowing out of the first chamber 28 reaches the hydraulic reservoir 20 over the first supply line 22 and over the opened relief valve 34.

Thereby the automatic shut-off valve 32 provides the assurance that the hydraulic cylinder 26 maintains its position in the neutral position, so that in the lifting and neutral position no hydraulic fluid can escape from the pressurized first chamber 28 and that in the lowering position permits the hydraulic fluid can drain off over the opened relief valve 34. In order to provide this assurance the automatic shut-off valve 32 should or must be arranged in a meaningful way as shown on the lifting side of the hydraulic cylinder 26 where the lifting side is the side of the hydraulic cylinder 26 in which the pressure is built up in order to lift the load. In the embodiment shown here the lifting side is the first chamber 28 of the hydraulic cylinder 26, where by rotating the hydraulic cylinder 26 the second chamber 30 of the hydraulic cylinder 26 could also be used as the lifting chamber. The first pressure line 40 represents an overload safety device, so that upon excessive operating pressure in the first chamber 28 of the hydraulic cylinder 26, that could be caused, for example, by excessive loading a limiting pressure is reached in the first pressure line 40 that opens the relief valve 34 in order to relieve the pressure.

In the spring support position, shown in FIG. 1 as the lowest position on the controller 12, the connection of the second supply line 24 with the hydraulic reservoir 20 is established. The connection of the first supply line 22 to the pump 18 or to the reservoir 20 is closed or remains closed if the system is shifted out of the neutral position into the spring support position.

As an alternative solution in the spring support position, a floating position could also be provided. In such a floating position, the controller 12 connects the first supply line 22 with the second supply line 24, where both supply lines 22, 24 are connected with the hydraulic reservoir 20 and the inlet of the controller 12 to which the pump 18 is connected is closed. As long as the control valve 52 is in its closed position, that is as long as the hydraulic accumulator 48 is separated from the hydraulic cylinder 26, and thereby the spring support is also deactivated, then the piston 29 in its spring support position can move only in the direction of the second chamber 30. Only by activating the spring support, can the piston 29 be deflected in both directions similarly to a spring. The activation of the spring support is performed by an activation switch 68 that transmits an activation signal to the control unit 66, whereupon the latter brings the control valve 52 into the open position. Alternatively the spring support could be activated automatically by the generation of an activation signal as soon as the controller 12 is switched into the fourth switch position.

For the opening position of the control valve 52, that is, for the activated spring support, the result is the following conditions, corresponding to the various switch positions:

In the lowering position (uppermost switch position of the controller of FIG. 1) the first supply line 22 is connected with the hydraulic reservoir 20 and the second supply line 24 is connected with the pump. A corresponding pressure builds up in the second supply line 24 or in the second chamber 30 through which the relief valve 34 is opened over the pressure line 42 so that hydraulic fluid can drain off out of the first chamber 28 over the supply line 22 into the hydraulic reservoir 20. Simultaneously the piston 29 can perform the spring motions since a connection has been established to the hydraulic accumulator 48 on the lifting side and from the hydraulic reservoir 20 on the lowering side.

In the neutral position (the second position from the top on the controller 12 of FIG. 1), all inlet and outlet connections to the controller 12 are closed, that is, no hydraulic fluid can flow through the supply lines 22, 24. In case a spring deflecting of the piston 29 occurs in this position, there is the danger of a cavitation effect in the second chamber 30 of the hydraulic cylinder 26 as a result of which seals in the hydraulic cylinder 26 could be damaged. In order to avoid this condition, the switch or the sensor 64 transmits a signal that is received by the control unit 66. Thereupon the control unit 66 generates a closing signal for the control valve 52 under consideration of a time delay, to satisfy a time delay in the neutral position. As soon as the control valve 52 is closed, the piston 29 can no longer perform any movement since all lines 22, 24, 46 are closed. As soon as the controller 12 is switched to a different position, the sensor 64 transmits a signal for the opening of the control valve 52. Therefore the signal of the sensor 64 supersedes the activation signal of the activation switch 68 in the switch logic of the control unit 66, so that the control valve 52 can be closed by a closing signal of the sensor 64, despite an activation signal from the activation switch 68.

In the lifting position (the third position from the top on the controller 12 of FIG. 1), the first supply line 22 is connected with the pump 18 and the second supply line 24 is connected with the hydraulic reservoir 20. In the first supply line 22 or in the first chamber 28 a corresponding pressure is built up through which the piston 29 is lifted so that hydraulic fluid can drain off from the second chamber 30 over the second supply line 24 into the hydraulic reservoir 20. Simultaneously the piston 29 can perform spring-like movements since a connection to the hydraulic accumulator 48 on the lifting side and a connection on the lowering side to the hydraulic reservoir 20 has been established.

If during a lowering or lifting process a bump is transmitted to the piston 29, it can deflect in a spring-like motion without any danger of cavitation, since the lowering side is unloaded in the direction of the hydraulic reservoir 20.

In the spring-action position (lowest switch position of the controller 12 of FIG. 1) the first supply line 22 is closed and the second supply line 24 is connected to the hydraulic reservoir 20. In this position the piston 29 can freely deflect as a spring. If it moves downward, due to a bump applied to it, the hydraulic fluid in the first chamber 28 is forced into the hydraulic accumulator 48. The pressure building up in the hydraulic accumulator 48 permits the hydraulic fluid to flow back into the first chamber 28, so that the piston 29 moves upward again. More specifically, the hydraulic accumulator 48 urges the hydraulic fluid towards the first chamber when the pressure in the hydraulic accumulator 48 reaches a predetermined level. This spring-like motion is repeated, if necessary, until the bump has been fully compensated. Moreover provision can be made that as soon as the controller 12 is moved or switched out of the spring-action position into another position, a deactivating signal is generated in the controller 12 for the spring action on the basis of the sensor 64 in the control unit 66 and thereby the control valve 52 is closed by a closing signal.

Figure 2:
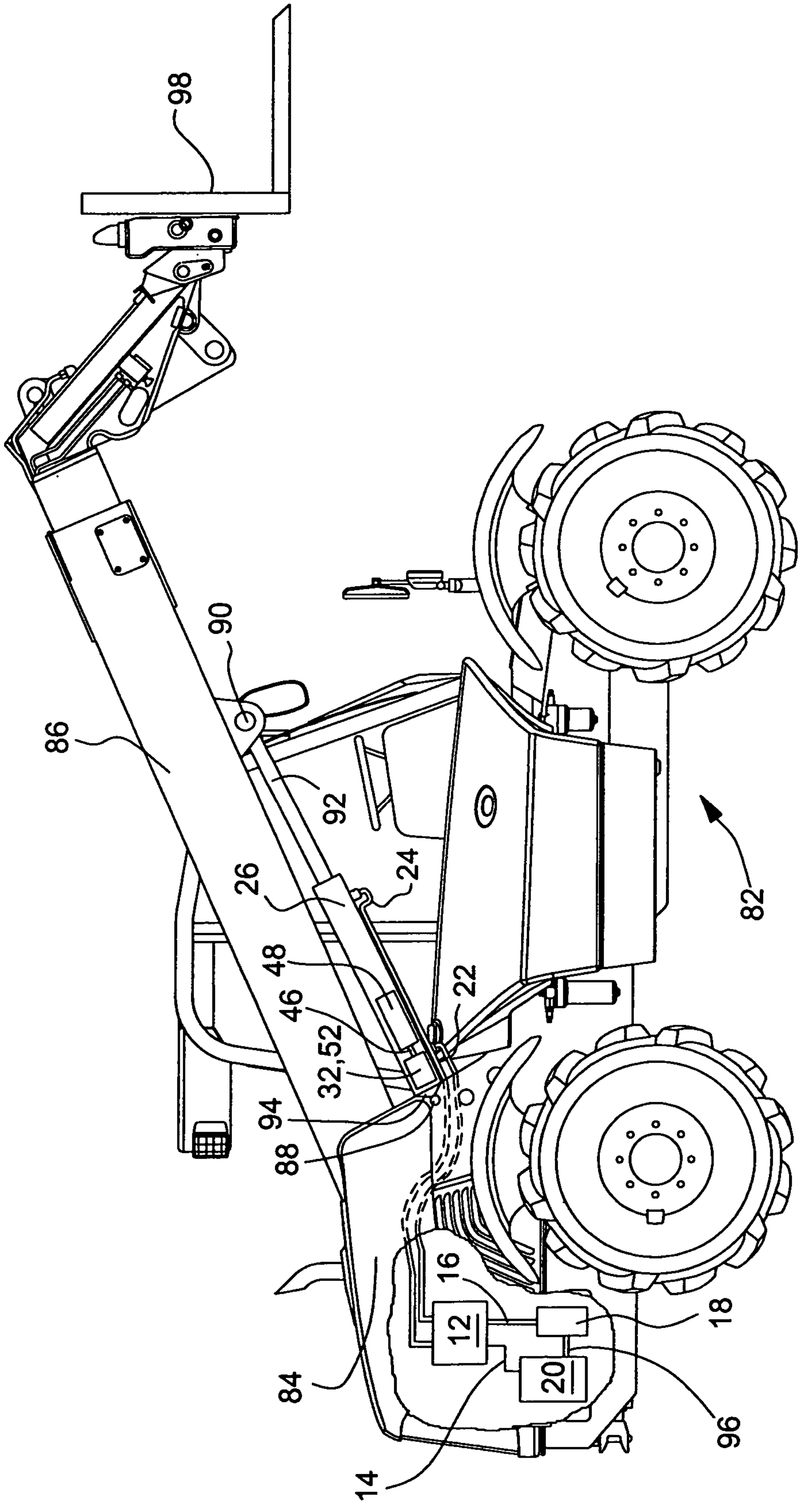
FIG. 2 shows a schematic view of a telescopic loader with a hydraulic arrangement of FIG. 1.

An application for the embodiments shown in FIG. 1 is clarified in FIG. 2. FIG. 2 shows a self-propelled telescopic loader 82 with a boom 86 connected in joints, free to pivot to a housing 84 or frame of the telescopic loader 82 that can be extended in a telescopic manner. A hydraulic cylinder 26 is arranged between the boom 86 and the housing 84 for the lifting and lowering of the boom 86. Here the hydraulic cylinder 26 is connected in joint, free to pivot, to a first and a second bearing location 88, 90, where the rod end side 92 is connected in joints to a second bearing location 90 on the boom 86 and the piston end 94 is connected in joints to the first bearing location 88 on the housing 84. Furthermore the hydraulic reservoir 20, the pump 18 as well as the controller 12 are positioned at or in the housing 84 and are connected to each other by hydraulic lines 14, 16, 96. Furthermore the supply lines 22, 24 between the controller 12 and the hydraulic cylinder 26 are shown in FIG. 2. The automatic shut-off valve 34 as well as the control valve 52 are located in a common valve building block directly at the hydraulic cylinder 26. The hydraulic accumulator 48 is preferably also arranged at the hydraulic cylinder 26 so that the hydraulic line 46 between the common valve building block and the hydraulic accumulator 48 can be configured as a rigid connection that does not require a separate automatic shut-off valve. Control or switching signals are generated over a control arrangement, not shown, with which the controller 12 as well as the control valve 52 are controlled or switched (see FIG. 1). Corresponding to the switch positions described above the hydraulic cylinder 26 can be actuated in such a way that the boom 86 can be raised, retained in a fixed position, lowered or retained with spring action. When the spring action is activated and in spring action position there is the assurance that during an excitation, for example, by the running gear of the telescopic loader 82, bump-like accelerations due to the free swinging of the boom are damped, so that the operating comfort can be increased, particularly when the operating tool 98 takes up loads and moves them.

Although the invention has been described in terms of only two embodiments, anyone skilled in the art will perceive many varied alternatives, modifications and variations in the light of the above description as well as the drawing, all of which fall under the present invention. In that way, for example, the hydraulic arrangement can also be applied to other vehicles, for example, to wheel loaders or front loaders or even to excavators or cranes, that are provided with hydraulically actuated components, that must be raised or lowered and in which spring support appears useful.

The invention claimed is:

1. A hydraulic arrangement comprising:

a hydraulic cylinder having a first chamber and a second chamber, a first supply line connected to the first chamber and a second supply line connected to the second chamber;

a hydraulic accumulator connected to the first chamber by a hydraulic line, the hydraulic line including a control valve;

a hydraulic fluid feeder being in fluid communication with a hydraulic reservoir and conveying a hydraulic fluid;

a controller having a lifting position, a lowering position, a neutral position, and a spring support position to control the hydraulic cylinder, the second supply line being fluidly connected to the hydraulic reservoir when the controller is in the spring support position, the hydraulic accumulator being configured to selectively urge the hydraulic fluid towards the first chamber when the controller is in the spring support position, and the first and second supply lines being substantially prevented from being connected to the hydraulic fluid feeder when the controller is in the spring support position.

2. A hydraulic arrangement as in claim 1, wherein the first and the second supply lines can be connected with the hydraulic reservoir by the controller.

3. A hydraulic arrangement as in claim 1, the control valve having a closing position and an opening position.

4. A hydraulic arrangement as in claim 3, the control valve closing in the closing position in one or more directions of flow.

5. A hydraulic arrangement as in claim 1, further comprising a control unit for automatically bringing the control valve into a closing position when the controller is in the neutral position.

6. A hydraulic arrangement as in claim 5, the control unit bringing the control valve into the closing position when the controller is not located in the spring support position.

7. A hydraulic arrangement as in claim 5, the control unit bringing the control valve into the closing position after a predetermined time delay after the controller is in the neutral position.

8. A hydraulic arrangement as in claim 1, the controller being a slide valve providing every switch position with at least two inlets and two outlets.

9. A hydraulic arrangement as in claim 1, the first supply line including an automatic shut-off valve that includes a check valve that closes in the direction of the controller and a relief valve, the relief valve being controlled by pressures in the first and second supply lines.

* * * * *